United States Patent
Alazemi et al.

(10) Patent No.: US 11,854,327 B1
(45) Date of Patent: Dec. 26, 2023

(54) SECURE BAGGAGE CLAIM SYSTEM

(71) Applicant: KUWAIT UNIVERSITY, Safat (KW)

(72) Inventors: Abdullah Jeluwi Alazemi, Safat (KW); Bedoor Faleh Almutairi, Safat (KW); Fatemah Mubarak Mohammed, Safat (KW); Batool Abdulhameed Saleh, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 18/151,415

(22) Filed: Jan. 6, 2023

(51) Int. Cl.
  *G07C 9/29* (2020.01)
  *G06K 7/10* (2006.01)
  *B64F 1/36* (2017.01)

(52) U.S. Cl.
  CPC .............. *G07C 9/29* (2020.01); *B64F 1/368* (2013.01); *G06K 7/10366* (2013.01)

(58) Field of Classification Search
  CPC ........ G07C 9/29; B64F 1/368; G06K 7/10366
  USPC ................ 414/273, 414, 285, 198, 350, 418
  See application file for complete search history.

(56) References Cited

U.S. PATENT DOCUMENTS

| | | | |
|---|---|---|---|
| 3,695,462 A | 10/1972 | Sullivan | |
| 5,222,855 A | 6/1993 | Bernard, II et al. | |
| 5,377,817 A * | 1/1995 | Kohl | B65G 47/261 198/781.03 |
| 8,334,753 B2 | 12/2012 | Herwats | |
| 9,334,115 B2 | 5/2016 | Bartelet | |
| 10,336,555 B1 | 7/2019 | Kurdi et al. | |
| 10,460,837 B1 * | 10/2019 | LaBorde | G06K 19/07749 |
| 2007/0284481 A1 * | 12/2007 | Linero | B64D 11/003 244/137.1 |
| 2010/0076796 A1 | 3/2010 | Klein et al. | |

(Continued)

FOREIGN PATENT DOCUMENTS

| | | |
|---|---|---|
| CN | 213634702 U | 7/2021 |
| EP | 3598383 A1 * | 1/2020 |
| WO | 2012066346 A1 | 5/2012 |

OTHER PUBLICATIONS

"RFID Baggage Handling and Tracking"; printed on Sep. 4, 2022 from https://lyngsoesystems.com/rfid-baggage-handling-and-tracking/.

(Continued)

*Primary Examiner* — Yong Hang Jiang
(74) *Attorney, Agent, or Firm* — Nath, Goldberg & Meyer; Richard C. Litman (57) ABSTRACT

The secure baggage claim system uses radio frequency identification (RFID) tags or the like to associate a particular item of baggage with the owner of that item of baggage. The secure baggage claim system includes a housing having a baggage entry opening, a baggage retrieval opening, and a vertically arranged carousel disposed within the housing for carrying and rotating a plurality of baggage carrying trays. A primary RFID tag reader reads a primary RFID tag secured to the item of baggage to associate the item of baggage with identification information corresponding to an individual. The item of baggage is further associated with one of the baggage carrying trays selected to carry the item of baggage. A door releasably covers and seals the baggage retrieval opening and is releasably locked by a locking mechanism. Authenticating input associated with the individual unlocks the door for retrieval of the item of baggage.

14 Claims, 5 Drawing Sheets

(56) References Cited

U.S. PATENT DOCUMENTS

| | | | |
|---|---|---|---|
| 2012/0056723 A1 | 3/2012 | Zhu | |
| 2013/0241712 A1* | 9/2013 | Motley, III | G06K 7/10009 |
| | | | 340/10.51 |
| 2015/0066349 A1* | 3/2015 | Chan | G01C 21/3697 |
| | | | 701/400 |
| 2017/0362033 A1* | 12/2017 | Mahfouz | G06K 7/1417 |
| 2020/0302729 A1 | 9/2020 | Geng | |
| 2020/0334630 A1* | 10/2020 | Al Issa | G06K 7/10297 |
| 2021/0174465 A1* | 6/2021 | Carpenter | G06Q 50/28 |
| 2021/0261062 A1* | 8/2021 | Kim | B60R 5/04 |

OTHER PUBLICATIONS

"Self-service automated bag drop"; printed on Sep. 6, 2022 from https://www.aeroexpo.online/prod/quavis/product-187247-62412.html.

\* cited by examiner

SECURE BAGGAGE CLAIM SYSTEM

BACKGROUND

1. Field

The disclosure of the present patent application relates to baggage handling and storage, and particularly to a secure baggage claim system for retrieval of baggage only by an authenticated recipient.

2. Description of the Related Art

Conventional baggage handling systems, such as those commonly used at airports, have not changed in operation in decades. Baggage handling is largely non-automated, making use of baggage handling personnel who physically load luggage and other baggage items onto a conveyor belt or carrousel. All of the baggage associated with a particular flight is delivered to the same carrousel, without any individual sorting, and the baggage is available to pick up at any point on its route, regardless of the presence of the owner. This lack of automation and security has caused theft of unattended bags to become a serious problem over the years. Authorization to leave with a piece of baggage is typically granted by an antiquated baggage check system, requiring an attendant to visually inspect individual luggage tags. The attendants who discharge the bags to the pickup point are often too busy or distracted to insist that claimers produce their baggage check to verify ownership. Theft becomes a particularly acute problem in those cases in which the baggage does not arrive on the same plane as the passenger.

The lack of automation and the need for manual assistance with and secure control over the bags that are deplaning have resulted in long delays for passengers and a greatly increased chance of having baggage stolen. In addition to theft, the potential for general tampering and/or the illicit insertion of contraband in baggage is a risk for the same reasons. Thus, a secure baggage claim system solving the aforementioned problems is desired.

SUMMARY

The secure baggage claim system uses radio frequency identification (RFID) tags or the like to associate a particular piece of baggage with the owner of that piece of baggage. The secure baggage claim system includes a housing having a baggage entry opening, a baggage retrieval opening, and a vertically arranged carousel disposed within the housing. The vertically arranged carousel includes a frame, a plurality of baggage carrying trays, and a mechanism for selectively and controllably driving movement of the plurality of baggage carrying trays.

For example, the vertically arranged carousel may have a chain drive system including a motor or the like that is coupled to at least one of an upper sprocket or a lower sprocket to drive rotation thereof. The upper and lower sprockets are respectively rotatably mounted on upper and lower portions of the frame. A continuous chain rotatably couples the upper and lower sprockets, and each of the plurality of baggage carrying trays is secured to the continuous chain. Thus, coupled rotation of the upper and lower sprockets, which is driven by the motor, drives the plurality of baggage carrying trays to rotate with the continuous chain.

A primary RFID tag reader is mounted external and adjacent to the baggage entry opening of the housing for reading a primary RFID tag secured to a piece of baggage to associate the piece of baggage with identification information corresponding to an individual. The piece of baggage is further associated with one of the plurality of baggage carrying trays selected to carry the piece of baggage.

A conveyor belt or the like may be provided for carrying the piece of baggage through the baggage entry opening and into the baggage carrying tray selected for holding that particular piece of baggage. As the baggage item enters the housing through the baggage entry opening, it is scanned by the primary RFID tag reader. The information stored in the primary RFID tag on the piece of baggage is linked to the individual who owns the baggage item, and when the primary RFID tag reader reads the primary RFID tag, the correspondence between the individual and the primary RFID tag is stored in memory, as is the correspondence between the primary RFID tag and the particular one of the baggage carrying trays selected to hold that particular baggage item.

An input device is provided to associate the baggage item with the individual. For example, the input device may be a secondary RFID tag reader for reading a secondary RFID tag embedded in a boarding pass held by the individual. Upon initiation of the secure baggage claim system, the individual may place the baggage item on the conveyor belt, where the primary RFID tag on the piece of baggage is read by the primary RFID tag reader. Either immediately before or immediately after, the secondary RFID tag reader is used to read the secondary RFID tag embedded in the boarding pass associated with that particular individual and is used to identify the individual. The identification information read from the secondary RFID tag is also stored in the memory, and the identification information stored in the secondary RFID tag is associated with the identification information stored in the primary RFID tag, thus linking the primary RFID tag (and the baggage item to which it is affixed) with the individual.

Each baggage carrying tray may include a tray frame having a plurality of horizontally arranged rollers rotatably mounted thereto. Thus, as the baggage item enters the housing through the baggage entry opening, the baggage item can easily roll onto the corresponding baggage carrying tray. A sensor, such as an infrared sensor or the like, may be mounted adjacent the conveyor belt to detect the presence of the piece of baggage to initiate movement of the conveyor belt.

A door releasably covers and seals the baggage retrieval opening and is releasably locked by a locking mechanism. To unlock the door, the individual enters identifying information into the input device. In the example discussed above, the individual again has the secondary RFID tag embedded in the boarding pass read by the secondary RFID tag scanner. The information stored in the secondary RFID tag identifies the individual and is linked to both the primary RFID tag on the piece of baggage and also the particular one of the baggage carrying trays that carries that baggage item. The motor is actuated to rotate the vertically arranged carousel until the matching baggage carrying tray is aligned with the baggage retrieval opening. The locking mechanism is then disengaged, allowing the individual to retrieve the baggage item through the unlocked door.

It should be understood that the secure baggage claim system may be portable, allowing baggage to be stored therein and then be loaded onto an airplane. In this way, the baggage can securely travel with the passengers. The baggage claim system would then be unloaded from the airplane when it lands, and the passengers could retrieve their baggage as described above.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
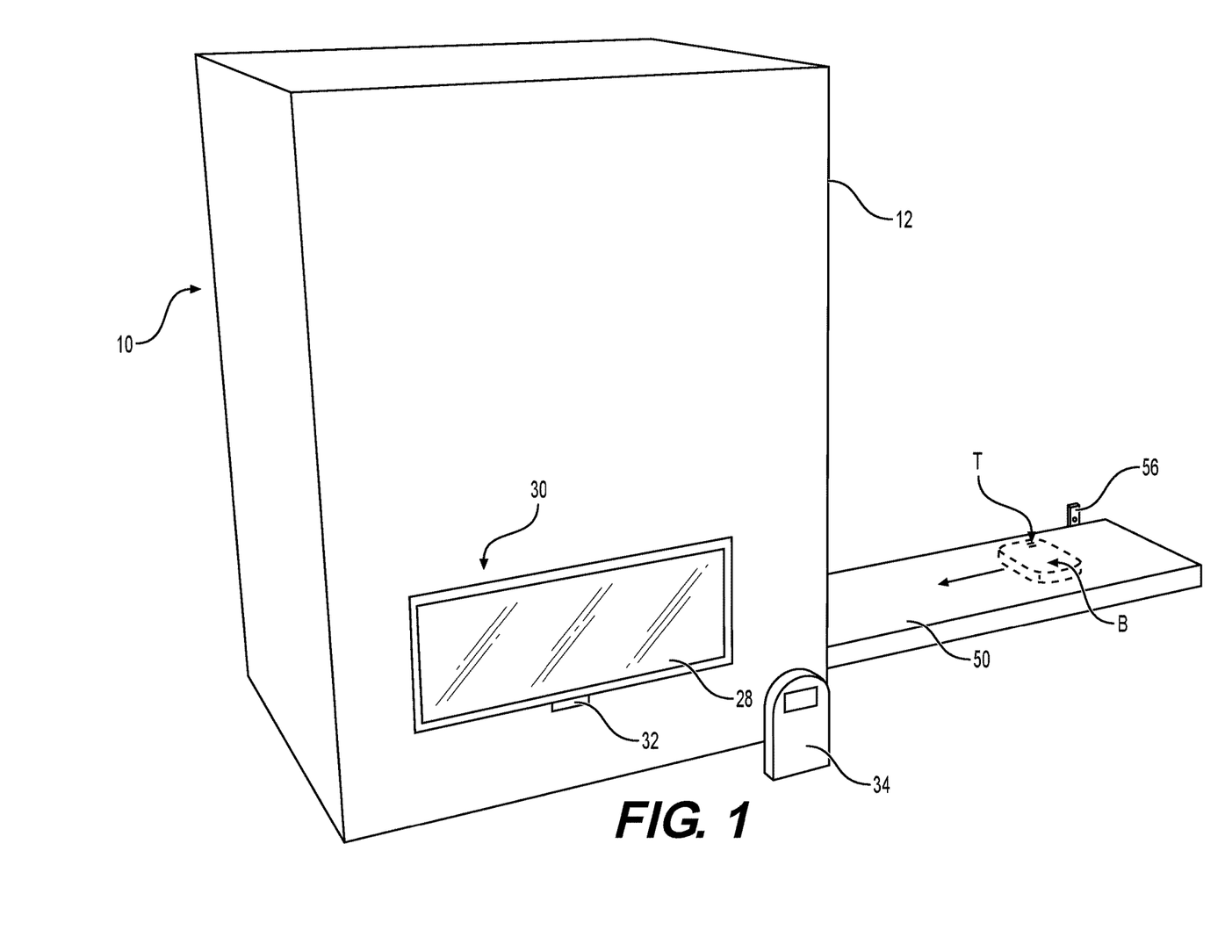
FIG. 1 is a perspective view of a secure baggage claim system.
Figure 2:
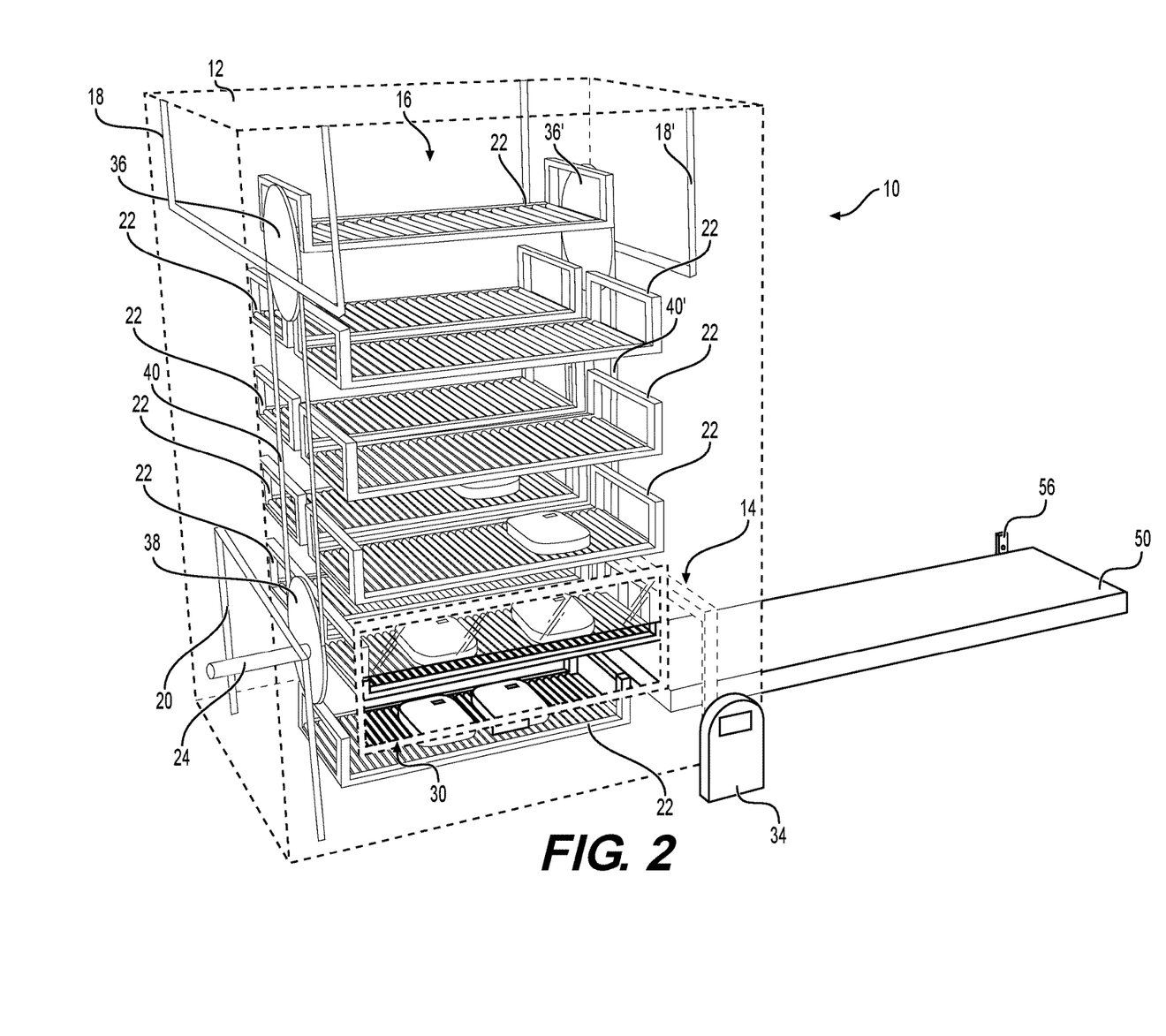
FIG. 2 is a perspective view of the secure baggage claim system of FIG. 1 with the housing in phantom, showing details of a vertically arranged carousel arranged within the housing of the secure baggage claim system.
Figure 3:
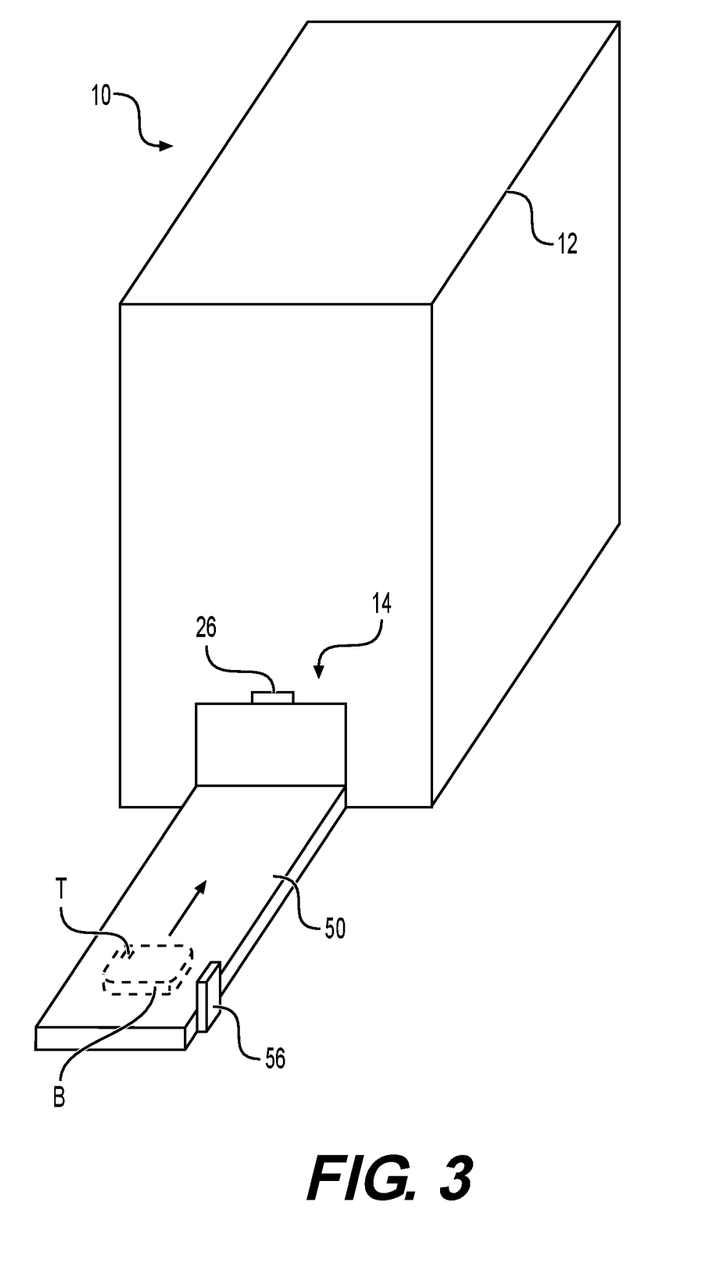
FIG. 3 is a perspective view of the secure baggage claim system of FIG. 1, showing entry to the housing.

The secure baggage claim system 10 uses radio frequency identification (RFID) tags or the like to associate a particular item of baggage with the owner of that baggage item. As shown in FIGS. 1-3, the secure baggage claim system includes a housing 12 having a baggage entry opening 14 and a baggage retrieval opening 30. A vertically arranged carousel 16 is disposed within the housing 12. It should be understood that the housing 12 is shown for exemplary purposes only, and that the housing 12 may have any suitable overall configuration and relative dimensions. Similarly, the location, dimensions and configuration of the baggage entry opening 14 and the baggage retrieval opening 30 are shown for exemplary purposes only.

As shown in FIG. 2, the vertically arranged carousel 16 includes a frame, a plurality of baggage carrying trays 22, and a chain drive or belt drive mechanism for selectively and controllably driving movement of the plurality of baggage carrying trays. For example, in FIG. 2, the frame is formed from separate upper and lower parts 18, 20, respectively, which are mounted on upper and lower portions of the housing 12, respectively. It should be understood that separate upper and lower parts 18, 20 are shown for exemplary purposes only, and that any suitable type of frame or other structure for supporting the upper and lower sprockets 36, 38 (as will be discussed in greater detail below) may be used.

In the exemplary system of FIG. 2, the vertically arranged carousel 16 is driven by a motor 24, which is coupled to the lower sprocket 38. However, it should be understood that the motor 24 may be replaced by any suitable type of actuator, rotational driver or the like, and may also be alternatively coupled to the upper sprocket 36, or to both the upper and lower sprockets 36, 38. In the system 10 of FIG. 2, the upper and lower sprockets 36, 38 are rotatably mounted on the upper and lower parts 18, 20 of the frame, respectively. However, as discussed above, the separate upper and lower parts 18, 20 are shown for exemplary purposes only, and the upper and lower sprockets 36, 38 may be rotatably mounted on upper and lower portions of any suitable type of frame or other supporting structure.

A continuous, endless belt or chain 40 rotatably couples the upper and lower sprockets 36, 38 or drive wheels, and each of the plurality of baggage carrying trays 22 is secured to the continuous chain 40. Thus, coupled rotation of the upper and lower sprockets 36, 38, which is driven by the motor 24 in this configuration, drives the plurality of baggage carrying trays 22 to rotate with the continuous chain 40. It should be understood that the upper and lower sprockets 36, 38 and continuous chain 40 may be replaced by any suitable type of mechanism for rotatably carrying the plurality of baggage carrying trays 22, such as a pair of pulley wheels and a continuous belt. Further, as shown in FIG. 2, a second set of sprockets and a second continuous chain may also be provided for driving the opposite ends of the plurality of baggage carrying trays 22. In FIG. 2, for example, a second upper sprocket 36' is rotatably mounted to a second upper part 18' of a second frame and is coupled, by a second continuous chain 40', to a second lower sprocket mounted on a second lower part of the second frame, each of which are hidden from view in FIG. 2.

As shown in FIG. 3, a primary RFID tag reader 26 is mounted external and adjacent to the baggage entry opening 14 of the housing 12 for reading a primary RFID tag T secured to a baggage item B in order to associate the item of baggage B with identification information corresponding to an individual. The baggage item B is further associated with one of the plurality of baggage carrying trays 22 selected to carry the baggage item B. It should be understood that the baggage item B is shown for exemplary purposes only, and that the secure baggage claim system 10 may be used to store any type of baggage or any other items that are to be temporarily stored for later secure retrieval. It should be further understood that the primary RFID tag T may be any suitable type of RFID tag, or, alternatively, may be replaced by any suitable type of identifying label or tag, such as a barcode, a near field communication (NFC) tag, or the like.

A conveyor belt 50 or the like may be provided for carrying the piece of baggage B through the baggage entry opening 14 and into the baggage carrying tray 22 selected for holding that particular item of baggage B. It should be understood that the conveyor belt 50 is diagrammatically shown in FIGS. 1-3 for exemplary purposes only, and that any suitable type of conveyor belt or the like may be used for carrying the baggage item B.

As the item of baggage B enters the housing through the baggage entry opening 14, it is scanned by the primary RFID tag reader 26. The information stored in the primary RFID tag T on the piece of baggage B is linked to the individual who owns the item of baggage B, and when the primary RFID tag reader 26 reads the primary RFID tag T, the correspondence between the individual and the primary RFID tag T is stored in memory 54, as is the correspondence between the primary RFID tag T and the particular one of the baggage carrying trays 22 selected to hold that particular baggage item B.

Figure 5:
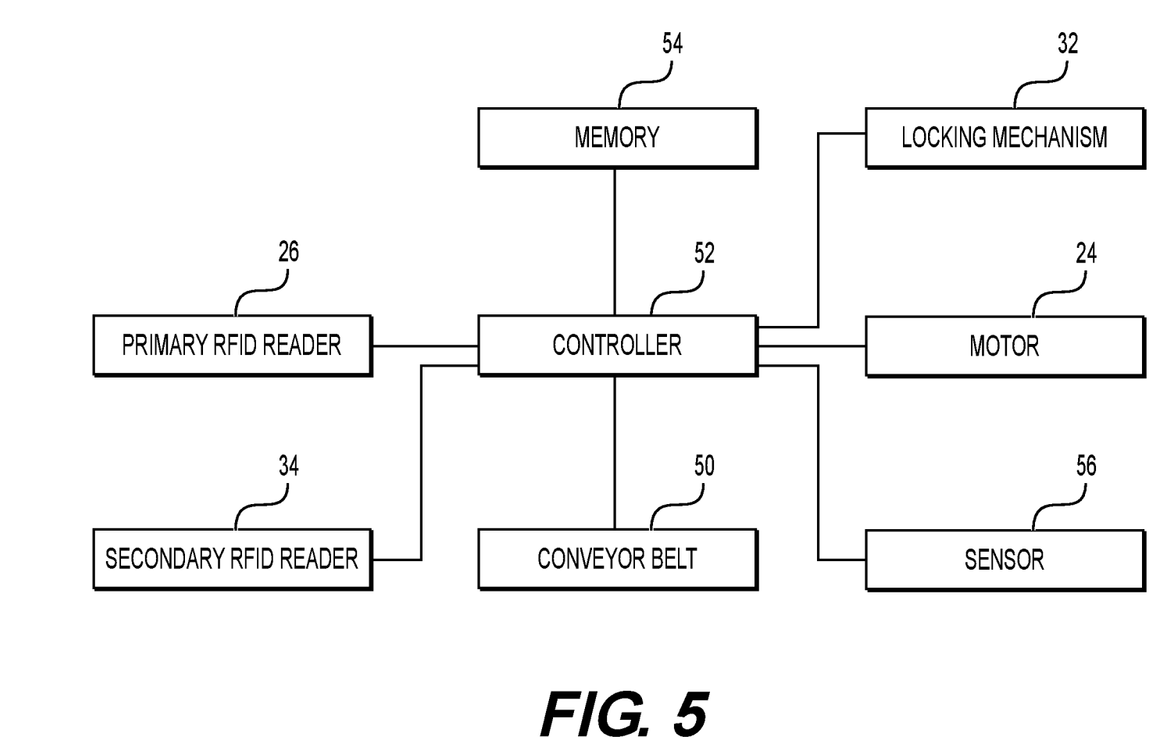
FIG. 5 is a block diagram schematically illustrating components of the secure baggage claim system of FIG. 1.

As shown in FIG. 5, the memory 54 is associated with a controller 52. It should be understood that any suitable type of controller may be used, including, but not limited to, a microprocessor, control circuitry, a programmable logic controller, or the like. The memory 54 may be any suitable type of computer readable memory. The primary RFID tag reader 26 is in communication with the controller 52 for receiving the information to be stored in memory 54, and the conveyor belt 50 is also under the control of controller 52.

An input device 34 is further provided to associate the piece of baggage B with the individual. For example, the input device 34 may be a secondary RFID tag reader for reading a secondary RFID tag embedded in a boarding pass (not shown) held by the individual. Upon initiation of the secure baggage claim system 10, the individual may place the item of baggage B on the conveyor belt 50, where the primary RFID tag T on the baggage item B is read by the primary RFID tag reader 26. Either immediately before or immediately after, the secondary RFID tag reader 34 is used to read the secondary RFID tag embedded in the boarding pass that is associated with that particular individual and is used to identify the individual. The secondary RFID tag reader 34 is also in communication with the controller 52 such that the identification information read from the secondary RFID tag is also stored in the memory 54. The controller 52 associates the identification information stored in the secondary RFID tag with the identification information stored in the primary RFID tag T, thus linking the primary RFID tag T (and the baggage item B to which it is affixed) with the individual.

Figure 4:
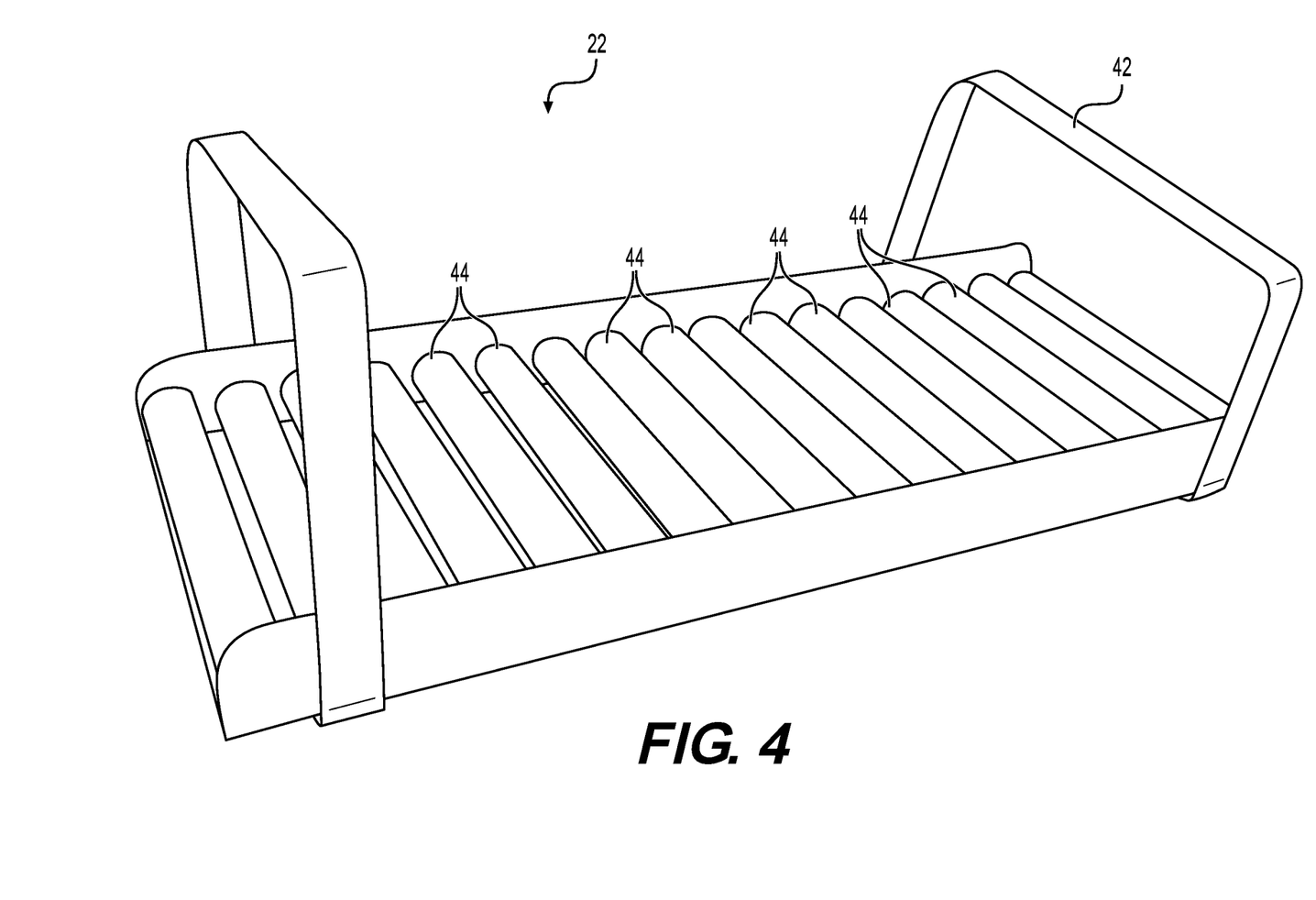
FIG. 4 is a perspective view of a baggage carrying tray used in the secure baggage claim system of FIG. 1.

As shown in FIG. 4, each baggage carrying tray 22 may, for example, include a tray frame 42 having a plurality of horizontally arranged rollers 44 rotatably mounted thereto. Thus, as the item of baggage B enters the housing 12 through the baggage entry opening 14, the baggage item B can easily roll onto the corresponding baggage carrying tray 22. Rollers 44 may be, for example, coated with rubber or a similar high friction material to prevent accidental sliding of the baggage. A sensor 56, such as an infrared sensor or the like, may be mounted adjacent the conveyor belt 50 to detect the presence of the item of baggage B to initiate movement of the conveyor belt 50. The sensor 56 is in communication with the controller 52. Thus, the controller 52 can activate or deactivate the conveyor belt 50 depending upon the detected presence of baggage.

A door 28 releasably covers and seals the baggage retrieval opening 30 and is releasably locked by a locking mechanism 32. In FIG. 1, the door 28 is shown as being transparent. However, it should be understood that any suitable type of door may be used. Additionally, it should be understood that the locking mechanism 32 may be any suitable type of controllable lock under the control of controller 52. For example, the locking mechanism 32 may be a solenoid lock.

To unlock the door 28, the individual enters identifying information into the input device 34. In the example discussed above, the individual again has the secondary RFID tag embedded in the boarding pass read by the secondary RFID tag scanner 34. The information stored in the secondary RFID tag identifies the individual and is linked to both the primary RFID tag T on the piece of baggage B, and also to the particular one of the baggage carrying trays 22 that carries that baggage item B. The motor 24 is actuated to rotate the vertically arranged carousel 16 until the matching baggage carrying tray 22 is aligned with the baggage retrieval opening 30 and door 28. The locking mechanism 32 is then disengaged by the controller 52, allowing the individual to retrieve the baggage item B through the unlocked door 28.

It should be understood that the secure baggage claim system 10 may be portable, allowing baggage to be stored therein and then be loaded onto an airplane. In this way, the baggage can securely travel with the passengers. The baggage claim system 10 would then be unloaded from the airplane when it lands, and the passengers could retrieve their baggage as described above. It should be further understood that the baggage entry opening 14 may be covered and sealed by any suitable type of door or the like, and that the conveyor belt 50 may be removable, allowing the conveyor belt 50 to be transported separately.

It is to be understood that the secure baggage claim system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A secure baggage claim system, comprising:
a housing having a baggage entry opening and a baggage retrieval opening;
a vertically arranged carousel disposed within the housing, the vertically arranged carousel including a frame, a plurality of baggage carrying trays, and a drive system for selectively and controllably driving movement of the plurality of baggage carrying trays;
a primary RFID tag reader mounted external and adjacent to the baggage entry opening of the housing for reading a primary RFID tag secured to a baggage item to associate the baggage item with identification information corresponding to an individual, the baggage item being further associated with one of the plurality of baggage carrying trays selected to carry the piece of baggage;
a door releasably covering and sealing the baggage retrieval opening;
a locking mechanism mounted on the baggage retrieval door for releasably locking the baggage retrieval door;
an input device in communication with the locking mechanism, so that entry of authenticating information associated with the individual through the input device unlocks the baggage retrieval door for retrieval of the item of baggage corresponding to the individual;
wherein the drive system for selectively and controllably driving the movement of the plurality of baggage carrying trays comprises a chain drive system having:
a motor;
an upper sprocket rotatably mounted on an upper portion of the frame;
a lower sprocket rotatably mounted on a lower portion of the frame, the motor being coupled to at least one of the upper and lower sprockets to drive rotation thereof; and
a continuous endless chain rotatably coupling the upper and lower sprockets, each of the plurality of baggage carrying trays being secured to the continuous endless chain; and
wherein each of the plurality of baggage carrying trays comprises:
a tray frame; and
a plurality of horizontally arranged rollers, each of the rollers being rotatably mounted to the tray frame.
2. The secure baggage claim system as recited in claim 1, wherein the input device comprises a secondary RFID tag reader for reading a secondary RFID tag embedded in a boarding pass associated with the individual.
3. The secure baggage claim system as recited in claim 1, further comprising a conveyor belt for carrying the baggage item to be read by the primary RFID tag reader through the baggage entry opening and into the one of the plurality of baggage carrying trays selected to carry the piece of baggage.

4. The secure baggage claim system as recited in claim 3, further comprising a sensor mounted adjacent the conveyor belt to detect presence of the baggage item to initiate movement of the conveyor belt.

5. The secure baggage claim system as recited in claim 4, wherein the sensor comprises an infrared sensor.

6. A secure baggage claim system, comprising:
a housing having a baggage entry opening and a baggage retrieval opening;
a vertically arranged carousel disposed within the housing, the vertically arranged carousel including a frame, a plurality of baggage carrying trays, and a drive system for selectively and controllably driving movement of the plurality of baggage carrying trays;
a primary RFID tag reader mounted external to and adjacent to the baggage entry opening of the housing for reading a primary RFID tag secured to an item of baggage to associate the item of baggage with identification information corresponding to an individual, the item of baggage being further associated with one of the plurality of baggage carrying trays selected to carry the item of baggage;
a conveyor belt for carrying the item of baggage to be read by the primary RFID tag reader, through the baggage entry opening, and into the one of the plurality of baggage carrying trays selected to carry the item of baggage;
a door releasably covering and sealing the baggage retrieval opening;
a locking mechanism mounted on the baggage retrieval door for releasably locking the door;
an input device in communication with the locking mechanism, so that entry of authenticating information associated with the individual through the input device unlocks the baggage retrieval door for retrieval of the item of baggage corresponding to the individual;
wherein the drive system for selectively and controllably driving the movement of the plurality of baggage carrying trays comprises:
a motor;
an upper sprocket rotatably mounted on an upper portion of the frame;
a lower sprocket rotatably mounted on a lower portion of the frame, the motor being coupled to at least one of the upper and lower sprockets to drive rotation thereof; and
a continuous endless chain rotatably coupling the upper and lower sprockets, each of the plurality of baggage carrying trays being secured to the continuous endless chain; and
wherein each of the plurality of baggage carrying trays comprises:
a tray frame; and
a plurality of horizontally arranged rollers, each of the rollers being rotatably mounted to the tray frame.

7. The secure baggage claim system as recited in claim 6, wherein the input device comprises a secondary RFID tag reader for reading a secondary RFID tag embedded in a boarding pass associated with the individual.

8. The secure baggage claim system as recited in claim 6, further comprising a sensor mounted adjacent the conveyor belt to detect presence of the item of baggage to initiate movement of the conveyor belt.

9. The secure baggage claim system as recited in claim 8, wherein the sensor comprises an infrared sensor.

10. A secure baggage claim system, comprising:
a housing having a baggage entry opening and a baggage retrieval opening;
a vertically arranged carousel disposed within the housing, the vertically arranged carousel including a frame, a plurality of baggage carrying trays, and a drive system for selectively and controllably driving movement of the plurality of baggage carrying trays;
a primary RFID tag reader mounted external to and adjacent to the baggage entry opening of the housing for reading a primary RFID tag secured to an item of baggage to associate the item of baggage with identification information corresponding to an individual, the item of baggage being further associated with one of the plurality of baggage carrying trays selected to carry the item of baggage;
a door releasably covering and sealing the baggage retrieval opening;
a locking mechanism mounted on the baggage retrieval door for releasably locking the baggage retrieval door; and a secondary RFID tag reader in communication with the locking mechanism, so that receipt of authenticating information associated with the individual through the secondary RFID tag reader unlocks the baggage retrieval door for retrieval of the item of baggage corresponding to the individual;
wherein the drive system for selectively and controllably driving the movement of the plurality of baggage carrying trays comprises:
a motor;
an upper sprocket rotatably mounted on an upper portion of the frame;
a lower sprocket rotatably mounted on a lower portion of the frame, the motor being coupled to at least one of the upper and lower sprockets to drive rotation thereof; and
a continuous endless chain rotatably coupling the upper and lower sprockets, each of the plurality of baggage carrying trays being secured to the continuous endless chain; and
wherein each of the plurality of baggage carrying trays comprises:
a tray frame; and
a plurality of horizontally arranged rollers, each of the rollers being rotatably mounted to the tray frame.

11. The secure baggage claim system as recited in claim 10, wherein the secondary RFID tag reader is configured to read a secondary RFID tag embedded in a boarding pass associated with the individual.

12. The secure baggage claim system as recited in claim 10, further comprising a conveyor belt for carrying the item of baggage to be read by the primary RFID tag reader through the baggage entry opening and into the one of the plurality of baggage carrying trays selected to carry the item of baggage.

13. The secure baggage claim system as recited in claim 12, further comprising a sensor mounted adjacent the conveyor belt to detect presence of the item of baggage to initiate movement of the conveyor belt.

14. The secure baggage claim system as recited in claim 13, wherein the sensor comprises an infrared sensor.

* * * * *